United States Patent
Wissenz

(10) Patent No.: US 11,054,175 B2
(45) Date of Patent: Jul. 6, 2021

(54) METHOD AND ARRANGEMENT FOR UTILIZING SOLAR ENERGY, METHOD AND SYSTEM FOR IMPLEMENTING AND DESIGNING AN ARRANGEMENT FOR UTILIZING SOLAR ENERGY AND COMPUTER PROGRAM PRODUCT

(71) Applicant: SOLAR FIRE CONCENTRATION OY, Tampere (FI)

(72) Inventor: Erik Wissenz, Tampere (FI)

(73) Assignee: SOLAR FIRE CONCENTRATION OY, Tampere (FI)

( * ) Notice: Subject to any disclaimer, the term of this patent is extended or adjusted under 35 U.S.C. 154(b) by 0 days.

(21) Appl. No.: 16/179,374

(22) Filed: Nov. 2, 2018

(65) Prior Publication Data
US 2019/0309992 A1  Oct. 10, 2019

Related U.S. Application Data

(63) Continuation of application No. 14/904,313, filed as application No. PCT/FI2014/050571 on Jul. 11, 2014, now abandoned.

(30) Foreign Application Priority Data

Jul. 11, 2013  (FI) ...................................... 20135765

(51) Int. Cl.
| | |
|---|---|
| F24S 23/70 | (2018.01) |
| F24S 50/20 | (2018.01) |
| F24S 50/00 | (2018.01) |
| F03G 6/06 | (2006.01) |
| F24S 30/425 | (2018.01) |

(52) U.S. Cl.
CPC ................ *F24S 23/70* (2018.05); *F03G 6/06* (2013.01); *F24S 23/80* (2018.05); *F24S 23/82* (2018.05); *F24S 30/425* (2018.05); *F24S 50/00* (2018.05); *F24S 50/20* (2018.05);
(Continued)

(58) Field of Classification Search
CPC .... F23J 2/40; F24S 23/70; F24S 50/20; F24S 23/00; F24S 2020/16; F24S 2023/876; F24S 2023/872; F03G 6/06
See application file for complete search history.

(56) References Cited

U.S. PATENT DOCUMENTS

| | | | |
|---|---|---|---|
| 4,102,326 A * | 7/1978 | Sommer ............... | G01S 3/7861 126/575 |
| 4,110,009 A | 8/1978 | Bunch | |

(Continued)

FOREIGN PATENT DOCUMENTS

EP        2233859 A1    9/2010

*Primary Examiner* — David J Laux
*Assistant Examiner* — Nikhil P Mashruwala
(74) *Attorney, Agent, or Firm* — Birch, Stewart, Kolasch & Birch LLP

(57) ABSTRACT

Prior art solar energy arrangements are typically structurally complex, have a limited concentration factor and temperature, and their dimensions are large. There is provided a solar energy arrangement and corresponding method for utilizing solar energy by directing sunrays or sunbeams with at least one solar concentrator towards at least one application, device or equipment utilizing solar energy, and a corresponding method, system and computer program product for implementing an arrangement for utilizing solar energy.

14 Claims, 4 Drawing Sheets

(52) U.S. Cl.
CPC .... *F24S 2023/872* (2018.05); *F24S 2023/876* (2018.05); *Y02E 10/46* (2013.01); *Y02E 10/47* (2013.01)

(56) References Cited

U.S. PATENT DOCUMENTS

| | | | |
|---|---|---|---|
| 4,110,010 A | | 8/1978 | Hilton |
| 4,243,018 A | | 1/1981 | Hubbard |
| 4,395,581 A | | 7/1983 | Girard |
| 4,463,749 A | | 8/1984 | Sobczak et al. |
| 6,820,611 B2 | * | 11/2004 | Kinoshita ............... F24S 30/48 126/576 |
| 7,109,461 B2 | | 9/2006 | Lasich |
| 7,192,146 B2 | | 3/2007 | Gross et al. |
| 7,677,241 B2 | | 3/2010 | Hickerson |
| 7,905,227 B2 | * | 3/2011 | Luconi ................. F24S 25/634 126/696 |
| 8,365,718 B2 | * | 2/2013 | Gilon ....................... F03G 6/06 126/595 |
| 8,430,090 B2 | * | 4/2013 | Angel .................. C03B 23/0258 126/601 |
| 8,490,396 B2 | * | 7/2013 | Xiang ................... F24S 30/458 60/641.11 |
| 8,952,307 B2 | * | 2/2015 | Blumenthal ............ F24S 23/77 250/203.4 |
| 2004/0031483 A1 | | 2/2004 | Kinoshita |
| 2010/0078011 A1 | * | 4/2010 | Feher ..................... F22B 1/006 126/600 |
| 2010/0229852 A1 | * | 9/2010 | Buckley ................. H02S 20/22 126/652 |
| 2011/0168160 A1 | * | 7/2011 | Martinez Moll ....... F24S 23/74 126/573 |
| 2012/0260907 A1 | | 10/2012 | Ba-Abbad et al. |
| 2013/0220303 A1 | * | 8/2013 | Schramek ............ F24S 30/455 126/600 |
| 2020/0343852 A1 | * | 10/2020 | Chentnik ............... H02J 3/381 |

\* cited by examiner

METHOD AND ARRANGEMENT FOR UTILIZING SOLAR ENERGY, METHOD AND SYSTEM FOR IMPLEMENTING AND DESIGNING AN ARRANGEMENT FOR UTILIZING SOLAR ENERGY AND COMPUTER PROGRAM PRODUCT

CROSS-REFERENCE TO RELATED APPLICATIONS

This application is a Continuation of U.S. patent application Ser. No. 14/904,313 filed on Jan. 11, 2016, which was filed as the National Phase of PCT International Application No. PCT/FI2014/050571 on Jul. 11, 2014, which claims the benefit of priority to Finnish Application No. 20135765 filed on Jul. 11, 2013, all of which are hereby expressly incorporated by reference into the present application.

FIELD OF THE INVENTION

The invention relates to solar energy arrangements.

BACKGROUND OF THE INVENTION

In prior art of solar concentrations there have been 3 main systems that have been commercialized. 1. Symmetric dish concentrators (using parabolic, spherical or Fresnel geometries) that turn always to face the sun so that the absorber, reflective surface and solar rays remain in the same internal configuration. 2. Linear systems, generally using extended parabolic reflector surface to concentrate on an insulated tube. 3. and heliostat fields where individual reflector surfaces track the sun independently to reflect light to a central absorber. Of these 3 main systems there exist many varieties and variations.

The draw backs have been: for system 1 the absorber must move relative the ground generally requiring more structural support and any piping leading to and from the absorber needing some moving parts; any vibrations the absorber may create, such as in the case of Stirling engine, are generally transferred to the reflector component. For system 2, as the absorber is in a line there is a limit on concentration factor and temperature; most configurations also require moving pipes. For system 3 it has been generally found that large scales are required and so large distances between the reflector surfaces and the absorber (requiring very high accuracy of construction and automation) and also large land areas are required, generally needing to be accurately leveled.

For each system there exist variations where disadvantages dealt with by mitigating features, but generally with the result of increasing cost or creating or increasing some other disadvantage.

One such non-standard line of research with designs appearing in the public domain, is an asymmetric Fresnel reflector geometry on individual rows, a fixed absorber relative the ground and the option of individually curved facets/reflectors to increase further concentration factor, all manually placed and calibrated with several pieces supporting and orienting each facet/reflector. The advantages of this system are 1. that all piping to and from the absorber has no moving joints and all structural pieces are straight members 2. the frame being square or rectangular and the rows being straight components across the frame 3. the design can be built with common materials and tools 4. the weight remains balanced during operation 5. the weight can be distributed directly into the ground on many wheels around a track (as the base frame is essentially the layout of a roof that rotates around the vertical axis).

One spreadsheet and one numeric algorithm was published by Erik (Eerik) Wissenz under the general GPL 3 license, any relevant conditions waved by the author to the current patent applicant, the first spreadsheet calculator gave only approximations based on a series of 2D solutions (so no 3D information resulted necessary to build a machine), and the second algorithm was erroneous in its calculations and did not even attempt to treat essential aspects such as curves for the individual facets/reflectors and other elements, essential for the invention treated here. A concept sketch copyright to the current patent applicant for a mass production idea was posted on-line, using the erroneous algorithm for calculating the facet/reflector angles and circular curves for individual facets/reflectors all exactly the same for each facet/reflector, and so this sketch did not represent a machine that could be built with good performance, nor was a method proposed to build such a machine with circular curves or otherwise, each facet/reflector still being supported by multiple pieces, the reduction of which is one of the main purposes of the current invention.

BRIEF DESCRIPTION OF THE INVENTION

According to an embodiment of a method for utilizing solar energy, the method comprises directing sunrays or sunbeams with at least one solar concentrator towards at least one application, device or equipment utilizing solar energy.

According to an embodiment of an arrangement for utilizing solar energy, the arrangement comprises at least one solar concentrator and at least one application, device or equipment utilizing solar energy, and in which arrangement the solar concentrator is arranged to direct sunrays or sunbeams towards the application, device or equipment utilizing solar energy.

According to an embodiment of a method for implementing or designing an arrangement for utilizing solar energy, which arrangement comprises at least one application, device or equipment utilizing solar energy and at least one solar concentrator arranged to direct sunrays or sunbeams towards the application, device or equipment utilizing solar energy, the method comprises determining at least one parameter relating to a construction or operation of the solar concentrator and/or at least one parameter relating to a construction or operation of the application, device, or equipment utilizing solar energy.

According to an embodiment of a system for implementing or designing an arrangement for utilizing solar energy, which arrangement comprises at least one application, device or equipment utilizing solar energy and at least one solar concentrator arranged to direct sunrays or sunbeams towards the application, device or equipment utilizing solar energy, the system comprises at least means for determining at least one parameter relating to a construction or operation of the solar concentrator and/or at least one parameter relating to a construction or operation of the application, device, or equipment utilizing solar energy.

According to an embodiment of a computer program product, the computer program product comprises program code means configured to execute the method when being run on an intelligent electronic device including a processor executing the computer program and a non-transitory computer readable recording medium for recording thereon the computer program.

According to an embodiment of a drill guide for manufacturing a solar device comprising a body frame, and supports for a plurality of rows of reflectors, and at least one absorber for receiving sunrays or sunbeams directed by the reflectors positioned in different angles to direct sunrays or sunbeams to the absorber, wherein the drill guide comprises an elongated guide pipe for receiving a bore bit and a body, wherein the guide pipe is rotatable with respect to the body around at least two axes, and the drill guide comprises angular scales corresponding to each of the axes, such that, when the body of the drill guide is fixed with respect to the body frame of the solar device at an installation position of the reflector or a row in the solar device, the angular scales correspond to guide pipe angles at the installation position of the reflector or the row for directing the sunrays or sunbeams.

According to an embodiment of manufacturing method of an arrangement according to an embodiment, wherein the reflectors or rows are attached to holes by fastening means for engaging the holes, wherein the holes are drilled at each installation position by drilling through a drill guide according to an embodiment.

DETAILED DESCRIPTION OF THE INVENTION

Glossary

Figure 1:
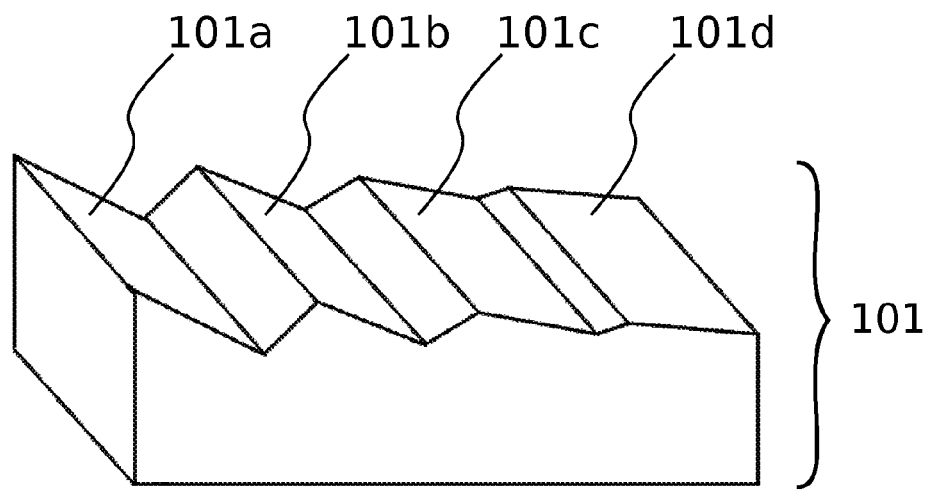
FIG. 1 illustrates machining a block to support reflectors.

Concentrator: device to reflect, refract or by some other physical phenomena increase the density of the sun's rays, generally where an absorber is or is intended to be positioned.

Facet/reflector: a concentrator utilizing reflection, or a surface reflecting the solar rays without concentration (though maybe one of many such "flat" reflectors that together concentrate the solar rays).

Reflector surface: the part of the concentrator that physically modifies the solar rays in direction; may also read as refraction in most instances.

Focus: where the solar rays converge after modification by the concentrator. Does not entail focus for imaging purposes in this paper, though some concentrators can achieve imaging focus it is not generally a design requirement for energy systems.

Secondary reflector: a subsequent modification of the solar rays in a distinct component of the device relative the primary reflector.

Absorber/target: sometimes called receiver, physically captures the energy "focused" by the concentrator and transfers it to the application. In the case of concentrated photo-voltaic the application directly absorbs energy, in this case there is an overlap between the terms application and absorber.

Application: a real or imagined use case of the concentrator, in terms of purpose and equipment, production profile (i.e. when energy is or is assumed to be actually needed), real location on the globe including atmospheric conditions, land topology, non-modifiable objects obstructing the sun's rays at any given time (building, trees etc.), and any other real or inferred information that can affect solar concentration design and installation for an individual use case. Or the category or all such cases; i.e. most of this paper references the "application" as information that would be provided to complete a real design case, much of the invention concerns the methods to employ for optimization of the system once the application is known.

Time domain: the range of time of interest for modeling or optimization purposes; normally all hours solar rays reach the device during the day or year. However, in some situations an application may only need to work for certain hours of the day, certain seasons, etc. and so the time-domain would refer to these intended hours of operation. For instance, a device intended for testing may only be intended to operate 1-2 hours a day in a certain season, and so the device can be tuned to perform best on these times.

Geometric aberration: rays off-target for a given time/solar elevation due to the geometric nature of the system, as opposed to aberration due to optical materials used, construction error, tracking error, or the diffuse component of solar radiation.

Real and ideal normal: due to the geometric aberration of the machine, to be defined more precisely in Method III, there is an important distinction between what the normal vector of a facet/reflector surface actually is (in reality or in virtually at a given point in the algorithms) which may or may not reflect rays directly onto point A, and what the normal would be in order to reflect directly onto A. It is often important to either compare these vectors or understand when the real normal does not equal the ideal normal for a given time/solar elevation.

A. Absorber fixed relative the ground, for support structure efficiency and piping.

B. Concentrator fixed relative the ground for support structure efficiency.

C. Smallest possible focus for smallest possible absorber surface or cavity opening, which provides maximum potential application efficiency; i.e. highest possible concentration factor.

D. Deep focus so that reflector surface has low angle away from the sun's rays (i.e. the area of perpendicular solar rays reflected is very close to the surface area of reflector utilized), to the point where this advantage is not outweighed by the natural aberration of solar rays, as the sun is a disk and not a point source at infinite distance (i.e. the solar rays are not exactly parallel).

Of these desired characteristics there has been as of yet no demonstration of an efficient system satisfying all 4 criteria (though of note, it is possible to approach maximizing all 4 criteria with a secondary reflector, where a primary absorber directs sunlight into the secondary reflector so that the sun's rays appear from a fixed source to this secondary concentrator; however, the cost of 2 reflector systems has proven to be non-commercial for many applications outside a narrow range, generally relating to scientific research).

Thus, each real system represents the designers belief that their chosen balance of or sacrifice of criteria will be cheaper to build and operate for the range of applications they intend to power.

That there is no design convergence in existing systems, but a group of very different systems currently being fielded often with the same application in mind (the generation of utility scale electricity for example) informs us that there is no industrial standard way to balance the 4 ideal criteria, and that there is room for further innovation.

Beyond the 3 main systems that have been commercialized, there has been many systems attempted that are very different from these, either fundamentally (such as a fixed spherical reflector and moving absorber), or so different in implementation as to be essentially an entirely different system (extremely small dishes embedded inside glass or engineering plastic to reflect onto a small cell).

Reflector dishes have also been made following the principle of rotation parallel to earth's axis in order to focus on a fixed point. These reflector dishes have shown to be difficult to scale in size for many similar reasons as symmetric dishes but with added complication of requiring a flexible structure for seasonal adjustments.

It is assumed the reader knows vector geometry, can calculate normal vectors to reflect a ray S on a point A to a point B, can find perpendicular vectors, the internal angle between vectors, translate points, transform vectors under rotations.

It is further assumed that when presented with a brute force algorithm with arbitrary allowable precision the reader can determine the required precision given the characteristics of the machinery available and an understanding of compounding errors (such as significant figures), and can furthermore reduce computational time significantly through techniques for multivariable numeric optimizations available in the literature, and can apply memonization and heuristics of previous results to speed up computations of new results. The inventor has made no fundamental breakthroughs in vector geometry, optical physics, and numerical/software optimization techniques, and presents "brute force" algorithms as they are the simplest to describe and all improvements involve either reducing the search space and/or searching more efficiently through the space; there is significant literature on these numerical and/or software issues and given the computational power, computational time and required precision, it is assumed the reader can construct appropriate implementations of the algorithms presented, as does the inventor when applying the presented methods to real world problems. The purpose of the inventor here is to describe methods that converge on the desired result, as this suffices to convey the knowledge required to duplicate those results. The author has not invented any new special way of reducing computational time, but uses standard techniques to decrease computational time. The techniques available in the literature to speed up such calculations are easy to apply to these methods, and the author does not begin an exhaustive list of the techniques readily available.

General Method

The general method to first start with a very simple numerical description of the intended system, then improve that system by a series of methods, the exact implementation depending on the application use-case. Once the numerical model has been sufficiently improved, the model can be converted to CAD designs and the optical components produced using automated machinery.

I. Method for Setting Facets/Reflectors by Numerical Method

In the description that follows vector geometry is employed as the preferred descriptive language. "Points" refer to vectors representing a physical location in the frame of reference, "vector" refers to direction, a line is defined as a point and a vector, a "normal" refers to a vector perpendicular to a surface at a point.

In this discussion the reference frame for calculations, unless mentioned otherwise, the frame of the solar device that is assumed the solar concentrating device is always turned to face the sun; the origin defined as the center of the solar device frame. So, in this reference frame the vector S representing the solar rays is always co-planar to the Z-Y plane (i.e. only the elevation angle of the solar rays is relevant in this frame of reference). Using the reference frame as the ground and rotating all the points representing the device to face the sun achieves the same results as described here, but with more calculations.

We define S as the vector representing the solar rays.

We define the center of an absorber as A. The location of A is generally above the facets/reflectors and placed on the vertical rotation axis of the machine, so that A is fixed relative to the ground when the machine rotates to face the solar rays.

We define an array of reflective facets/reflectors F of equal size and tightly packed, so that when all surfaces are coplanar with the x-y plane, there is no extra space between the facets/reflectors and no overlap.

Each F is a surface, but we will only refer to points and normal vectors at those points to define this surface in our calculations.

We define the center of a given facet/reflector as Fc.

We define N as the normal vector of a given facet/reflector.

We define a series of lines R that intersects all Fc in that exist on lines (i.e. on rows) that are parallel to the x-axis. If the initial array of facets/reflectors is a 10×10 grid, then there are 10 such R.

We define R as the line around which all F must rotate, by the same degree for a given R, during operation of the machine; i.e. the relative configuration of all F on a given R is constant throughout operation of the machine.

Thus Fc=Rp+aRv, where Rp is a vector to a point on the Row line, a is a scalar multiple, and Rv is the row vector. If we wanted to define 10 facets/reflectors on a Row with equidistant facet/reflector centers starting at Rp we would calculate Fcn=Rp+(a*n)R, where n is incremented from 0 to 9.

We define an imaginary/virtual facet/reflector for reference purposes, Fi represented by Fci and Ni, such that Fci is on R and intersects the y-z plane and such that Ni reflects rays from Fci to A for a given S. Fi is the local-reference-vector of each row, as for Ni is set for a given S, then for any S' non-equal to S, Ni can be rotated around R to reflect rays from Fci to A for S'; i.e. Fci for a given R does not experience geometric aberration during tracking of the machine. Since all Fc that are not coplanar to A and S experience geometric aberration (the ideal normal vector for aal such Fc for a given S cannot be made to equal the ideal normal vector for S' only by rotation around R).

We can now calibrate the device numerically for a given S by solving the reflection of S to A for every Fc, including every Fci.

The angles of every N relative to R (the internal angle between every N and corresponding R) can be extracted using a formula such as the dot product theorem. We can call this angle the Roll.

The angle between N and the plane formed by base vectors Rv and Ni passing through Rp can be extracted using the theorem for the internal angle between a vector and a plane. We can call this angle the Pitch.

For every F, the position along R of each F can be recorded as well and the Roll and Pitch.

This information can be used to preset all facets/reflectors on the machine using a jig that can set angles in 2-axis, for instance drilling through a wood beam or any suitable material, or set by an automated machine that can drill a hole at the angle of the normal vectors or create a surface with N as a normal vector. In the case of drilling a hole (or otherwise fixing a rod collinear to N at Fc) a facet/reflector can then be attached perpendicular to the support rod such that it's normal reconstructs the corresponding N. In the case of creating a surface with normal N a facet/reflector can be glued or otherwise fixed to the surface.

To avoid obstruction of the facets/reflectors, the support structure can be placed below the facets/reflectors, and at the extremity of the entire row support structure, hinges attached such that the center of rotation of the fabricated row intersects the center of the facets/reflectors.

As the real sun moves, the machine can be turned manually or by automation to face the sun, and each row can be turned manually or by automation to reflect light from Fci towards A for every S.

Of note, though the all Nci for each R are not equal, if S changes to S' all Nci must rotate the same amount to reflect rays from Fci to A. Thus all the rows can be attached to a mechanism that when moved causes the rows to rotate equal degrees, and this mechanism can be powered by a single actuator.

A machine built by the above Method I can be improved upon by the following methods below.

II. Method for Tracking Solar Device

Though mechanical systems for tracking two axis system exist in prior art, automatic tracking of a machine built by method I presents a complication that the reflection stray from A whenever the solar rays are not at the same angle of elevation as the calculations and construction assumed.

For, each F on R is fixed on R, and only the frame may rotate around the vertical axis and each R may rotate on itself, when S changes there is no simultaneous satisfaction of the reflection equation for all F on R. Each facet/reflector can be individually tracked to reflect onto A, but this involves rotating the frame and the row it is fixed to in such a way that other dependent facets/reflectors (i.e. physically on the same row and frame) do not reflect onto A.

As a consequence it is not trivial to know to what degree each row must be rotated to best reflect onto A. When the machine is symmetrical in quantity and disposition of facets/reflectors through the y-z axis as well as symmetrical in illumination, the following two algorithms can be used:

a. A facet/reflector on each row can be chosen as a reference, the ideal N for that facet/reflector for the given time can be calculated and R can be rotated such that the plane formed by the real N and R matches the plane formed by the ideal N and R. This method is an approximation.

b. A further improvement to method to Method IIa is to, once this method is calculated, then calculate the intersections of all reflections from facets/reflectors on the given row, calculate all intersections with the absorber surface and calculate the average distance between each intersection and the center of the absorber. The row can then be rotated positively and negatively using a search function to converge on the angle of the row that minimizes, for the given sun elevation, the distance between reflection intersections and the center of the absorber. If other design characteristics affect the absorber (obstructions, pipes etc), these characteristics can be included to block or modify certain reflected rays that encounter these design characteristics altering the calculation of least distance between absorber intersections and the center of the absorber.

III. Method to Minimize Geometric Aberration:

It is has been mentioned that the facets/reflectors experience geometric aberration. The above tracking method will converge on the best rotations of R regardless of degree of geometric aberration. However, to minimize the geometric aberrations a deeper understanding is required.

The ideal normal vector for a given Fc can be calculated as $$Q = Fc - A$$

$$Nc = Q + S$$

So if S' changes Nc' must also change. However, we can rotate the machine to face the sun and rotate each row to direct light to A, so if geometric aberration does exist we must prove that these operations cannot transform Nc for a given S to Nc' for a given S'.

Rotation of Nc around R will conserve the internal angle between Nc and R, what we have called the Roll angle.

$$\text{Roll} = \mathrm{acos}(Nc \cdot R)/|Nc||R|$$

Roll remains constant through any rotation of of Nc around R.

As we have taken the frame of reference of the frame which rotates to face the solar rays, S is coplanar to the y-z plane.

A simple calculation shows that $$\mathrm{acos}((Q+S) \cdot R)/|Q+S||R| \neq \mathrm{acos}((Q+S') \cdot R)/|Q+S'||R|$$

Therefore, Nc cannot be transformed to Nc' through rotation around R.

The notable exception is when the internal angle between Nc and R is perpendicular as it is if Nc is coplanar to A and S, in which case the x component of both Nc and S are both 0, and so the dot/scalar product returns 0 regardless of y and z components. So this explains more clearly the use of Fci defined as existing on R and the y-z plane.

A machine constructed following Method I may perform very poorly for, among other reasons, poor choice of S in which to calibrate the simulated machine.

So, once all Nc are calibrated for a given S, the machine will experience geometric aberration for all points in the time-domain where S' does not equal S.

a. To improve the situation an algorithm to select the best time to calibrate is as follows.

1. Define time domain, time increment and application geographic location.
2. Calibrate machine for the minimum solar elevation.
3. Simulate machine over time domain, where for each time increment all R are rotated following the Method II and the distance between each ray intersection with the absorber is recorded.
4. Repeat steps 2 and 3 for incrementing solar elevation by desired accuracy, until maximum solar elevation is attained.
5. Retain calibration that results in minimal average distance between ray absorber intersections and A.

b. The above method results in the best solar elevation in which to calibrate the solar machine so as to minimize geometric aberrations throughout the time domain. Further improvement it is possible with the following algorithm:

1. Calculate all ideal N for each facet/reflector for start of time-domain.
2. Calculate orientation of N relative the reference vector, record this relative orientation as rotations transforming the reference vector to N, called relative components of N.
3. Calculate solar intensity based on literature for given site or geographic area.
4. Repeat 1 through 3 incrementing time, until end of time domain.
5. Average all ideal relative components of each N weighted by solar intensity.

c. Perform Method IIIb but also weight for absorptivity; for instance, if the application is predicted to be in a cooler state at certain times, then more net-power to the absorber can be provided compared to the same situation with a hotter absorber. The above algorithm can be weighted for net-power to the absorber rather than simply solar intensity.

d. Perform Method IIIc, weighting for the economic value of the net-power at each given time, given sufficient economic information about the intended application.

IV. Method for Reducing Obstruction or Shadowing for Adjacent Facets/Reflectors on a Row 1. Order the facets/reflectors such that the facet/reflector n+1 represents a facet/reflector further from the center of the machine than facet n.
2. Orient the facets/reflectors: calculate N such that N represents a surface that will reflect S to A.
3. Calculate the distance between Fcn and Fcn+1 such that no light is obstructed by n, set the position of Fcn+1 to this optimized position.
4. Since the position of Fcn+1 has changed N no longer reflects to A, so repeat steps 4 and 5 until the desired precision has been reached.
5. For further refinement, repeat for all values of S that are of interest weighting for the value of the S at that moment in time, either the expected intensity of the Sun and/or the expected monetary value of the sun's energy at each point in time, given the application. Average all these results based on the weighting scheme.
6. Repeat the steps 2 through 7 for a facet/reflector where the exterior mirror in the first s round is now the interior mirror and a new exterior mirror position is optimized.

V. Method for Increasing Concentration Factor by Curving Individual Facets/Reflectors on Solar Device Once calculations of methods I-IV have been carried out for AFRC with flat facets/reflectors, further improvement is possible by curving each individual facet/reflector with 2D or 3D curvature (2D curvature is refers to a curve that is describable in 2D with a linear extrusion in the 3rd dimension such as a circle extruded to form a pipe, and 3D curvature is where the curve itself requires a 3 dimension description, such as a sphere). This has been shown to be the case in the public domain using a structure behind each facet/reflector to apply pressure to the facet/reflector, generally by turning bolts, so as to curve the facet/reflector to affect the reflected rays in the desired way. Further improvement to this method is possible in both accuracy and allowing setting curvatures by automation.

a. Method for simple 2D curvature

1. Choose time and calculate solar elevation.
2. Rotate all R to focus on A.
3. For each F, calculate a perpendicular unit vector H (representing physically the "height" of the facet/reflector) to the corresponding N and R, choose distance increment q, calculate F2 such that F2=F+qH.
4. Calculate ideal N, N2 for F2.
5. Project vector N2 for F2 onto plane formed by base vectors H and N.
6. Calculate vector B that is perpendicular to N and H.
7. Calculate unit vector C such that C is perpendicular to both N2 and B, add ½qH to ½qC to arrive at F2' from F.
8. Repeat steps 4 to 7 with F2' as starting location F2, until solution converges below construction tolerance.
9. Repeat steps 3-8 with the final F2' as F1, until extremity of facet/reflector is reached.
10. Repeat steps 3-9 with −q (i.e. if positive q in the above steps defines points on a curve going from the center of the facet/reflector to the top, −q defines a curve going from the center of the facet/reflector to the bottom).

b. Method for improving 2D curvature algorithm

As Method Va is essentially the calibration algorithm except the position of each F is not given (i.e. not simply on R) but must be found given F1 and N1 and the ideal curve, that is unknown but can be converged upon through the proposed method to arbitrary position given a solar elevation, the same method of improvements proposed for calibrating flat facets/reflectors can be applied to the calibration of the curves: i.e. the "best" curve of the day can be found or a weighted average can be generated using the same algorithm.

c. Method for 3D facet/reflector curvature

Repeat the above methods Va and Vb, except starting at every F representing a point on the 2D curve, define H as perpendicular to N and B for every F. i.e. repeat algorithm but perpendicular to local segments and local normal vectors on the 2D curve, finding the curve "side to side" given the curve from "top to bottom" of the facets/reflectors.

VI. Method for Simulating Power Output

For a given facet/reflector calibration and absorber.

1. Start at beginning of time-domain
2. Calculate solar elevation and track machine using method II.
3. Divide facets/reflectors into points with associated normal vectors (such as already provided by Method V). Calculate cosine loss for each normal vector, multiply by solar intensity, multiply by facet/reflectors surface area, divide by number of points representing the facet/reflector surface, multiply by reflection loss; i.e. effective delivered power.
4. Calculate intersection of all rays with absorber, and total effective power.
5. Calculate power to absorber and losses of absorber (assumed physical model of absorber) to arrive at net-power, divide by time-increment; i.e. calculate total joules captured by absorber during time increment. Record net-energy captured.
6. Repeat 2-5 incrementing time until end of time-domain, sum all net-energy captured.

VII. Method for Increasing Cost-Effectiveness by Removing Inefficient Facets/Reflectors.

Each facet/reflectors is more or less efficient given distance to absorber, cosine losses throughout the day, or position within the structure (if some structural element blocks light, some facets/reflectors may become less efficient than others).

1. Use methods I and II to populate a rows and facets/reflectors beyond the intended machine size.
2. Calculate power provided by each facet/reflector given the application.

3. Remove facets/reflectors starting with least efficient until:
   a. Intended total mirror surface, or total power is achieved; i.e. remove inefficient mirrors until x Kw-h per year is achieved. Or y surface area is achieved.
   b. Removing the facet/reflector is overridden by other design criteria in which case move to next least inefficient facet/reflector.

For instance, a design criteria maybe that the frame is rectangular in shape for ease of construction in which case the algorithm may include a facet/reflector in the corner as it remains in the rectangle but exclude facets/reflectors on a center row that are more efficient than the corner facet/reflector but lie outside the rectangle. Though it is worth to note that though the outer frame maybe rectangular it may still be desirable to remove facets/reflectors in the corner as they are less optically efficient and require more structure to support, so not cost-effective to include even though there is geometric space within the frame (i.e. space within the frame does not entail placing a facet/reflector).

The designer may use the algorithm to create a base case and subsequently add or remove facets/reflectors during the design process based on structural considerations, or the designer can augment the algorithm with these structural constraints in terms of geometry and cost to arrive at the best possible configuration given the assumptions.

VIII. Method for Optimizing Simple Absorber Surface Area:

Once a local-optimum concentrator configuration is derived using methods I, II, III, significant efficiency losses or gains depend on the absorber surface area and shape.

A simple absorber is defined as being a surface that is smooth and near uniform temperature over its surface. For instance, a flat thermally conductive surface transferring the energy of the focused solar rays to circulating water (i.e. the water temperature is below the maximum temperature of an object in focus) can be modeled as a simple absorber.

1. Determine allowed curve of absorber given design constraints; generally either flat, parabolic, spherical. Define surface boundaries characteristics, such as circle, square, triangle, n-polygon, or any allowable boundaries.
2. Define surface, with bounds at or beyond maximum design criteria.
3. Divide surface into smaller surfaces, called receiver tiles, use tile sizes of adequate size for intended precision (smaller tiles increases accuracy).
4. Calculate re-radiation and convection losses of each tile given application temperature and assumed absorber material characteristics. Calculate total loss of each tile over time-domain.
5. Run simulation at desired accuracy (i.e. time iteration increment and ray density within simulation), over time domain, calculate power received by receiver tiles and total power over time domain.
6. Remove tiles of which losses equal or are greater than power received by tile, or tiles below cost-effectiveness model (i.e. it may be assumed a tile must absorb at least x joules to be cost-effective).
7. Repeat steps 2-6 with increments of all allowable curves, using brute force or classic, genetic, or heuristic search algorithm to find surface with maximum net power and minimum surface area. For convex curves chance of re-radiation being reabsorbed based can be included (modeling radiative characteristics of a surface at given temperature, material and topology is well understood in the literature).
8. Once local-optimum is found with steps 2 to 7, further refinement can be made by calculating domain-time and variation of application temperature. For instance, when absorber is in a warm-up phase, then during this time radiation losses are less and so net-power to the application is greater than when at intended application temperature. So given the local-optimum absorber geometry and any other relevant application data, the temperature profile can be determined.
9. Repeat steps 2 through 7 with temperature profile, then repeat step 8 with new curve, stop algorithm when change in result is below intended construction precision.

IX. Method for Minimizing Geometric Aberration by Linear Variation of Absorber Position:

When geometric aberration occurs, if the absorber is allowed a linear movement it is possible to move the absorber to a region of greater ray convergence to increase efficiency.

The simplest way to effectively achieve this is a linear movement perpendicular, or close to perpendicular, to the facet/reflector field. Once the linear movement is chosen, generally constrained by structural considerations, given an optimized machine modeled with the above methods, for a given time the machine can be tracked to and the average geometric aberration can be calculated for a series of A along the path the absorber is able to move. The absorber can then be moved to the value of A with the minimum of geometric aberration. This method always decreases geometric aberrations and can reduce geometric aberrations to roughly a quarter of former values for configurations in the region of an absorber height roughly equal to the span of the facet/reflector field (i.e. non-extreme configurations).

X. Method for Increasing Land-Use by Overlapping Devices

The effective footprint of the described solar device is the circle the machine traces through its range of rotation. A device placed outside the tropics need not rotate fully to track the sun throughout the time-domain, in which case the footprint is not a full circle but a circle with two triangular cuts on the side.

Using known methods for packing shapes, a maximum amount of machines can be packed given the footprint.

However, the situation can be improved by constructing the machine to allow overlap. As generally the facet/reflector plain of each machine is not flat relative the ground but the side facing the sun is lower than opposing side (to decrease interference between rows), the structure of the machine can be made so that adjacent machines can overlap without impacting each other.

Overlap of machines can allow more light to be captured throughout the time-domain.

To calculate a base-line overlap.

Each machine can be treated as a full solid rotating to follow the sun to simplify calculations, but fully simulated machines could also be used to fine tune the result.

In this method the ground frame of reference must be used and so both the azimuth and the zenith angle of the solar rays are relevant.

1. Set constraints on concentrator displacement range (for instance concentrators are on an East-West line and can be moved on this line).
2. Set time to start of time-domain
3. Turn concentrators to face the sun.
4. Position concentrators as close as possible without shadowing. Record position and solar intensity.
5. Increment time and repeat steps 3-4, through entire time-domain.

6. Average the recorded positions weighting for solar intensity.

XI. Method for Increasing Land-Use Efficiency by Placing Multiple Concentrator Systems on Single Base Frame:

When removing inefficient facets/reflectors using Method VII, depending on the concentration factor required and the efficiency of each optical surface required, the concentrator can radically compress towards the Y-Z plane, as both cosine losses and geometric aberrations increase the further from the Y-Z plane a facet/reflector is positioned. When "squeezing" facets/reflectors around the Y-Z plane (i.e. removing facets/reflectors far from this plane) is required for optical efficiency, this reduces land-use efficiency; i.e. the amount of total facet/reflector density on a given land area; for, the machine must still rotate in a circle and occupy a circular footprint. Even though machines can be places so as to "overlap" as in Method XI, there are generally structural limits of inconveniences.

To improve the land-use, two or more such "squeezed" concentrators can be placed on the same base frame side by side with an absorber corresponding for each concentrator. If the required individual concentrator has a rectangle footprint with length twice that of width, then two such concentrators mounted on the same base frame forms a square.

The symmetry of the facet/reflector field in this case can also be desirable to break in order to fill a circle for the 2 or more adjoining concentrators. If the machine must rotate fully and no overlapping in the field is allowed, then the effectively occupied footprint of the machine is a circle, and so filling a circle corresponding to the base frame maximizes density of facets/reflectors and power within the footprint (though not necessarily maximizing cost-effectiveness, as discussed in Method IX). However, generally it is structurally difficult to fill a circle and the overlap technique may be easier to accomplish when a single or multiple absorber concentrator has roughly square facet/reflector field.

XII. Method for Optimizing Secondary Optic (or Simple Cavity or Semi-Cavity Absorber)

A secondary optic maybe required to further increase the solar concentration factor.

A secondary optic has an opening (that admits light), reflective internal walls (that transform light) and a back (that absorbs light).

Due to the asymmetries in the machine considered, there is no simple formula to design a secondary absorber.

1. Set number of internal walls, maximum size of internal walls, and size of back absorber.
2. Set internal walls around the opening, perpendicular to the opening. For instance to form a "box" with one side the opening. The intersection of the walls with the opening plane is the opening boundary.
3. Set A to center of opening.
4. Start at beginning of time-domain
5. Track machine to A and calculate intersection I of rays crossing the opening plane. Discard rays that are outside the opening boundary.
6. Calculate path through secondary optic using ray-tracing and reflection techniques, until intersecting the back of the secondary. For each reflection on an internal wall of the absorber multiply the effective power of the ray by the reflection loss. Record total power delivered to absorber.
7. Repeat steps 4-6 until end of time domain, record total power.
8. Repeat steps 3-7 incrementing opening plane towards facet/reflector plane so that A is incrementally between the secondary opening and the back absorber, until a maximum power is recorded.
9. Repeat steps 2-8 incrementing the slope of the first reflective plane, until a maximum power is recorded. If change of slope makes plane size to exceed maximum, move backing towards opening retaining relative configuration of reflective walls to the absorber back, until reflective planes do not exceed maximum size.
10. Repeat 2-9 incrementing the reflective plane, until maximum power is recorded.

XIII. Method for Optimizing Row Positioning

The above methods improve a single row. The positioning of the rows can also be improved.

For improving distance between facets/reflectors on the same row the dynamic nature of the system could be largely ignored, investigated only for extreme fine tuning. The reason is that the method concerned positioning parallel the x-axis and the component of the sun vector does not change on that axis, but only the y and z components (ignoring tracking errors). Due to this, changes of the solar vector on the y and z components had small effect on the interference between facets/reflectors on a row parallel the x-axis.

Interference between rows concerns displacement parallel the y and z axis and so the same components as are dynamic in the solar vector. It is thus much more important to take into account the dynamic nature of the system.

Another important point is that in improving the relative position rows, two competing factors must be taken into account. By packing the rows very close so that at no point during the time-domain rays pass between the rows, land-use is maximized. By separating the rows in the z and y axis so that at no point one row interferes with another, use of optical surface is maximized (i.e. at no point does an optical surface not contribute energy to the system). However, in the first case, the result would be points on the optical surface that are only illuminated for a moment(s) during the time-domain, and in the second case light passes through the rows which would be reflected except for a single moment(s) of the time-domain if the rows were packed a bit closer. Hence, it is both a waste to have optical surface that functions only momentarily during the time-domain as well as forgo optical surface that would function the entire time-domain excepting momentarily. Both extremes are thus undesirable.

a. The following method improves the effectiveness of the system for co-planar rows (which are often cheaper to realize):

1. Start at 0 inclination of the row-facet/reflector plane.
2. First 1 row position (for instance at center of the machine)
3. Set time to start of time domain.
4. Calculate position of all other central facets/reflectors (facets/reflectors on y-z plane), such that no rows interference using Fresnel equations. Record separation of facets/reflectors and solar intensity.
5. Repeat step 4 with incrementing time through entire range of time domain.
6. Perform weighted average of separations.
7. Simulate machine power output over time-domain using.
8. Repeat steps 2 through 7 incrementing inclination of row-facet/reflector plane.
9. Run until maximum total power output reaches maximum; i.e. inclination n+1 results in less power generation than inclination n.

The above method will balance land-use and optical-surface-use with each increment in the time-domain contributing to the result weighted for the solar intensity at that time. This creates a rational balance between the two competing criteria.

b. The above method can be improved when design requirements place more value on one criteria or the other, in which case the monetary value can be modeled and the region around the result of Method XIIIa can be explored to achieve a better result.

c. Method XIIIa can also be improved by considering the whole real row. Once the result of method XIIIa has been calculated, the entire row can be set using the methods of this patent application concerning rows. A full ray engine can be built or one existing in the public domain can be used (Google built a function to calculate the interference between heliostats that can be used in this case, at any given moment the machine can be viewed as a heliostat field in a given configuration; it is the dynamic behavior of the machine that is different to a heliostat field) to determine precisely the real row interference: facets/reflectors near the exterior of a row will not have the same interference as the central facets/reflectors, due to different reflection angles as well as the chance for rays to pass between facets/reflectors of an adjacent row. Such fine-tuning is however generally not necessary.

d. The above methods can be improved further by allowing non-co-planar rows. This can be achieved by changing the algorithm of Method XIIIa to not treat all rows simultaneously but progress row by row.

1. Set one row and calculate the adjacent rows using Method XIIIa.

2. Calculate the next adjacent rows using Method XIIIa.

This will allow the inclination between each adjacent row to freely optimize. A more efficient machine results for the same optical surface area, but it may be more difficult to build.

e. The above algorithm can also run allowing only a limited number of changes in the inclination between rows.

XIV. Method for Dynamically Covering Net-Loss Absorber Surfaces

As the ray convergence of the device in question is dynamic, the re-radiation and convection losses throughout the time-domain are also dynamic. In Method VIII the absorber is limited to a shape and size where the entire absorber surface or opening captured sufficient net-energy over the time-domain. However, due to the dynamic nature of the ray convergence, some regions that are included by Method VIII have net-power loss during certain time and some regions that were excluded in that method have net-power gain during certain times. By using the simulation method of Method VIII instead of averaging the result, insulators or the cavity opening can be dynamically moved to the optimum size and shape, given the mechanical constraints. Again the conduction losses, thermal losses and cost of a larger absorber, as well as cost of such a dynamic system, must be modeled to determine if the system is cost-effective. In most normal applications the benefit of such a system is doubtful, with the current costs of automation; nevertheless, in certain high performance requirements or with lower automation costs such a system becomes more attractive as compared with the size of the concentrator itself, the absorber requires relatively little material.

XV. Method for Reducing Aberration by Dynamic Frame Rotation:

One method to reduce geometric aberration of the system is to move the entire frame and absorber to face directly the sun at all times; i.e. convert the machine to a symmetric Fresnel reflector dish. However, in doing so, the structural weight distribution advantages and fixed absorber position of the system in question are sacrificed.

A compromise hybrid system can be made where the facet/reflector field is structurally allowed to tilt or rotate around the absorber; i.e. a rotation around a line parallel to the x-axis. Allowing such a tilt the frame of reference of frame essentially means reducing the path of the sun; i.e. reducing the range of solar elevations the facet/reflector field experiences.

Since a reflective surface must be at the half angle between the incoming and desired outgoing ray, any degree of rotation of the reflector field in the above manner reduces by 2 degrees the effective solar elevation range. Due to this doubling of effectiveness a range of rotation of the reflector field of 15 degrees would mean reducing the effective solar elevation range by 30 degrees, which is a sizable decrease.

If the solar device is augmented in this way, all the previous optimization methods can be performed given this parameter.

One way to accomplish this facet/reflector field rotation is by using curved main structural beams that can slide through supports on the circular track to achieve rotation. The center of rotation can be placed at the absorber so there is no need to displace the absorber, though tilting the absorber as to remain in the same configuration relative the facet/reflector field maybe desirable. This way requires new major structural pieces only modification to the main support beams and a sliding mechanism on the circular track supports. However, the range of rotation is fairly limited; increasing force is required the greater the rotation, and movement of the main beams may not exceed their supports.

Another way to accomplish this is mounting the whole frame on large hinges so that the whole frame is balanced. Less force is required to achieve greater rotation, but the center of rotation are these hinges in close proximity to the facet/reflector field, and so the absorber must both displace and tilt to remain in the same relative configuration.

The cost of such a hybrid system is not insignificant, but in high performance systems requiring high concentrations and so low geometric aberrations and relatively large powers the weight distribution scheme allows, such a system could be competitive with symmetric or double reflecting systems at certain scales.

XVI. Method for Increasing Focal Point Uniformity

A non-uniform focal point presents serious challenges to many applications for thermal stress reasons or as a requirement of the application.

As the ray convergence is dynamic large changes in flux distribution can occur throughout the time-domain.

The methods of reducing the geometric aberration will improve the uniformity of the ray convergence. Likewise, the secondary optic can be optimized given a non-uniformity penalty model, converging on the best solution. But further improvement is possible without any new component.

Construction error will of course increase uniformity by diffusing the light, but at the cost of potential efficiency. Though being able to predict and model construction error can improve optimization of the absorber or secondary optic, reducing construction error is desirable.

A further method of increasing uniformity is possible without any new component. As some facets/reflectors experience low geometric aberrations, instead of orienting these facets/reflectors to reflect onto A (the center of the absorber), their focus can be changed to other parts of the absorber. If 2 facets/reflectors experience no geometric aberration (i.e. facets/reflectors placed on the y-z plane), then 1 facet/reflector can be focused on one side of the absorber and the other on the opposite side. Facets/reflectors that experience low aberration not exceeding the absorber area can be oriented in similar fashion. Facets/reflectors that experience aberration that exceed absorber area can still be repositioned insofar as the gain of efficiency from uniformity does not exceed optical penalties. However, high-aberration facets/reflectors, when experiencing aberration, together increase uniformity by increasing diffusion (as aberration of all the facets/reflectors is not towards the same point), but when geometric aberration decreases (when the optimum optical performance for the time-domain is approached) the rays converge; and so during convergence if low-aberration facets/reflectors are reflecting to another part of the absorber uniformity is significantly increased.

To achieve this, the algorithm is quite simple:

1. Identify facets/reflectors that can be modified without significant optical penalty determine degree of movement acceptable (i.e. without increasing time spent off-absorber during the time-domain).

2. Either reposition these facets/reflectors in a methodical way (to focus on different points around the absorber in sequence) or simply randomly perturb these facets/reflectors within the accepted range.

XVII. Method for Industrially Fabricating Numeric Design or Concentrator Row

Once all or sufficient methods of improving the numerical description of the design have been applied.

a. The space between and below the facets/reflectors on each row can be filled to create a block with the facet/reflector surfaces on top of the block. The row is now a single piece in a computer model.

FIG. 1 illustrates machining a block, indicated by 101, to represent all the optical data of above methods and to support reflectors, indicated by 101a through 101d This block row can now be fabricated using 3D milling or 3D printing techniques. Reflective surfaces can be glued or otherwise attached to the corresponding facet/reflector surfaces on the block. The row can then be mounted on the machine with hinges to rotate as described in the numerical model. Likewise, a "negative/female" mold of the block can be made, and the final product created using the appropriate material (such as resin and fiber glass).

Figure 2:
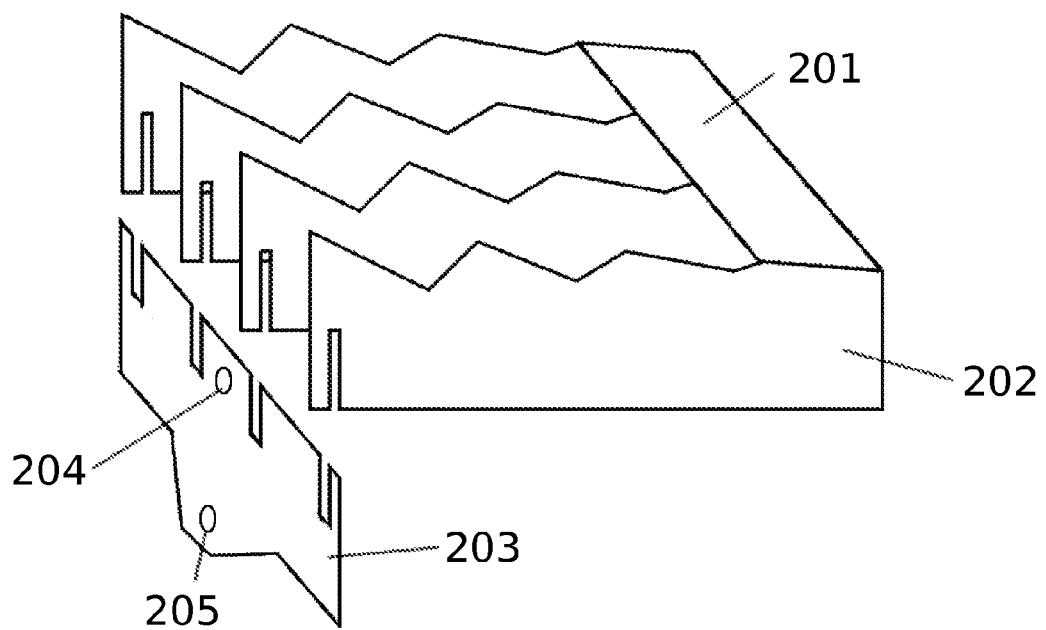
FIG. 2 illustrates a multipiece technique to support the reflectors.

FIG. 2 illustrates assembly for supporting reflectors with support sheets.

FIG. 2 illustrates a multipiece technique to support the reflectors, one supported reflector example indicated by 201. Slits can be added to connect with other pieces (see FIG. 7) as alternative to placing the reflectors on-top of the supports as shown in FIG. 2. The cross-sections can be cut using CNC cutting techniques. A piece on each end, indicated by 203, can link the cross-section together. Facets/reflectors can then be placed across the cross-sections to correspond to the facet/reflector surfaces in the numeric model.

Any number of cross sections, one example indicated by 202, can be used. 1 cross-section can be used if there is a piece to attach the facet/reflector to the cross-section. 2 cross-sections can be used to support flat facets/reflectors or facets/reflectors that have been already curved using techniques for 2D or 3D curving of reflective surfaces. 3 or more facets/reflectors can be used to force-flex facets/reflectors into a 2D or 3D curvature. A 4 cross-section configuration is shown in FIG. 2.

LEGEND

201—Facet/reflector mounted on cross-section supports (only one is shown).
202—Cross-section support cut using CNC cutting methods.
203—Piece to connect and fix cross-section pieces and interface with frame.
204—Rotation point to fit axis of rotation of row (axis of rotation can be a bar fixed to this hole, and passing through bearings mounted on the frame).
205—Rotation point to interface tracking mechanism. As each row has a different relative angle, this interface with the tracking mechanism can be placed by CNC so that the relative angle is already set (see FIG. 5, objects 504a through 504d). Row rotation can also be actuated by a gear controlling the rotation of the row directly (such as worm gear).

Figure 3:
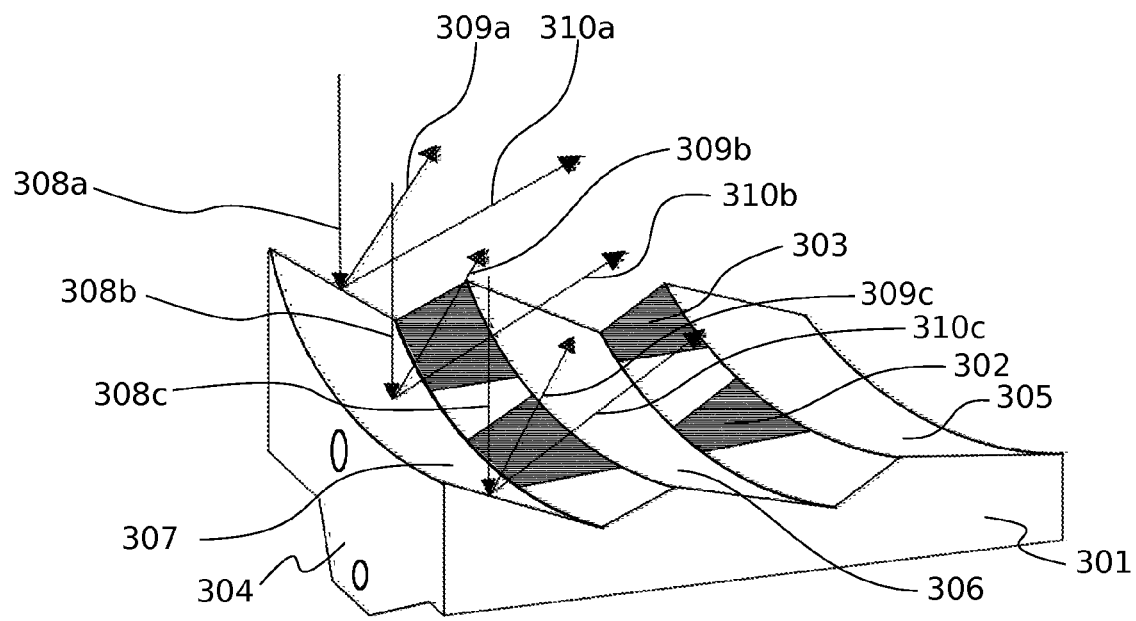
FIG. 3 illustrates reflections of sunrays from one reflector support assembly of the solar device.

FIG. 3 illustrates reflections of sunrays from one reflector support assembly of the solar device.

Sunrays for one reflector, indicated by lines 308a through 308c, arrive in parallel at the reflector. The figure shows 2D curvature to increase concentration factor such that the normal vector to the surface of the reflector, 309a, 309b, 309c, are not colinear, and so the resulting reflected sunrays, indicated by 310a, 310b, 310c, are not colinear and so can converge on the target to increase concentration factor. The support plates/sheets, indicated by 301, 302 and 303, are each unique with respect to each other to control the 2D curvature of the facet/reflector, indicated by 305, 306 and 307, fixed on-top. Piece 304 joins these horizontal supports, as described in FIG. 2, object 203.

Figure 4:
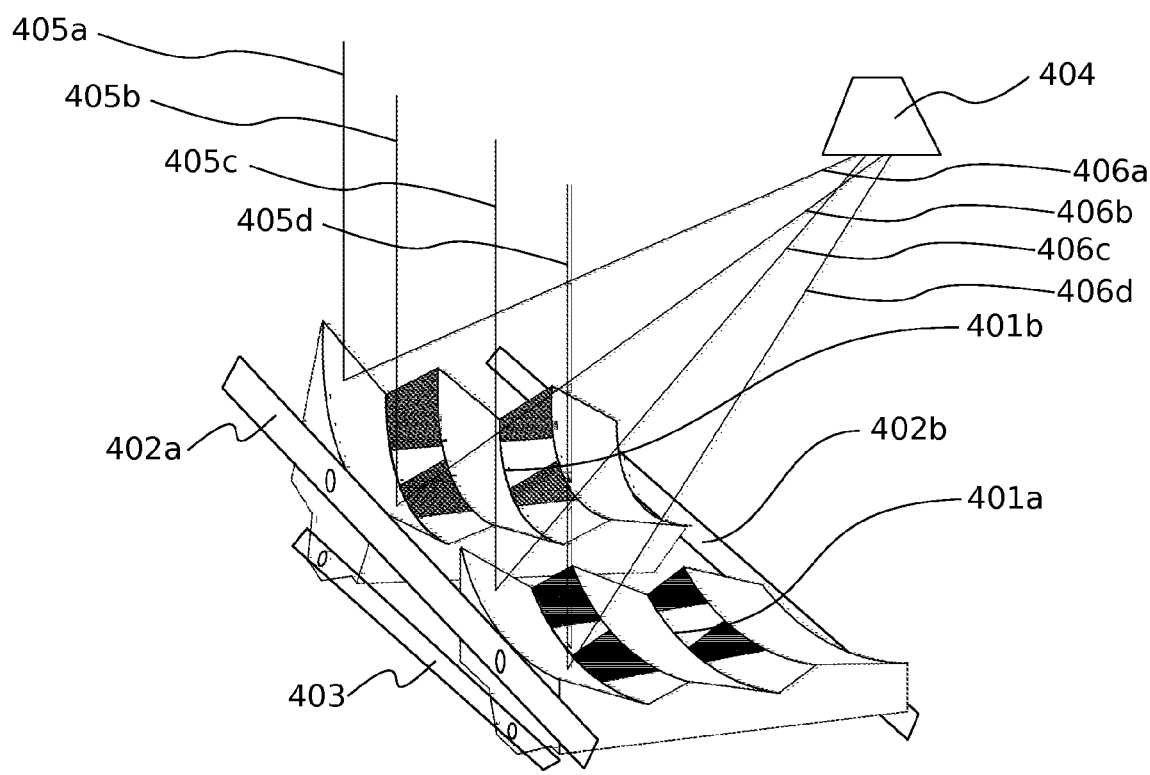
FIG. 4 illustrates reflections of sunrays from two rows of the solar device.

FIG. 4 illustrates reflections of sunrays from two rows of the solar device.

An embodiment of an arrangement for utilizing solar energy, the arrangement comprises two solar concentrators, indicated by assemblies 401a and 401b, (arranged together to form a larger solar concentrator) and one application device or equipment utilizing solar energy, indicated by object 404, and in which arrangement the solar concentrator is arranged to direct sunrays or sunbeams or other solar radiation towards the application, device or equipment utilizing solar energy.

In order to converge incoming sunrays, select sunrays indicated by lines 405a through 405d, on the absorber/target, indicated by 404, 2 assemblies described in FIG. 3, indicated by 401a and 401b, each optimized for their respective positions relative the absorber/target, are shown mounted between two structural supports, indicated by 402a and 402b. The two assemblies 401a and 401b support plates/sheets can be uniquely cut to converge sunrays on the absorber/target. Each assembly must be inclined at a relative angle with respect to each other in order to converge sunrays on the absorber/target; the reflected select sunrays are indicated by lines 406a through 406d. Both assemblies can be coupled together by a piece, indicated by 403, to control rotation at the same rate by a single motion (see FIG. 5).

Figure 5:
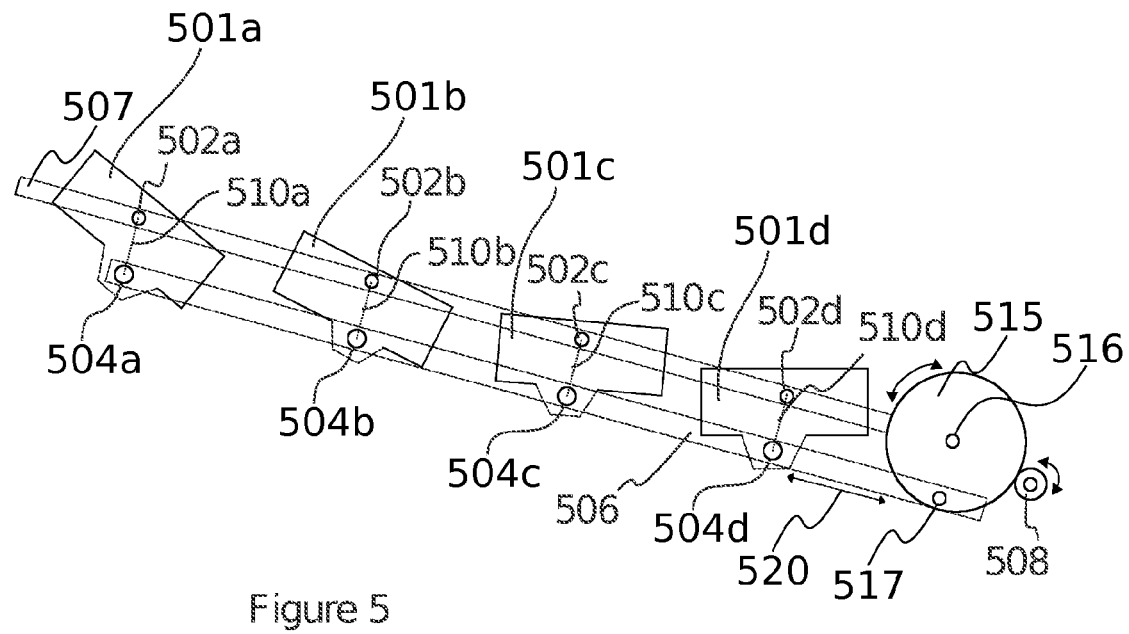
FIG. 5 illustrates a tracking mechanism for adjusting position of rows of reflectors.

FIG. 5 illustrates a tracking mechanism for adjusting position of the rows.

The side profiles of assemblies described in FIG. 2 through 4 are shown, 501a through 501d, each inclined at a different relative angle to reflect sunrays towards the target (the whole frame is rotated around the vertical axis to face the sun, and all rows must then be rotated at the same rate to compensate the elevation of the sun on the horizon); each assembly supported on a structure indicated by 507. In order to couple each assembly together to control ration accurately, rotation points for the coupling mechanism with respect to the rotation point of each assembly must all be parallel; i.e. The line drawn, between 502a and 504a, between 502b and 504b, between 502c and 504c, between 502d and 504d, indicated by 510a through 510d, must be parallel to the coupling piece, indicated by 506, remains straight. A gear/wheel, or lever, indicated by 515, around a rotation point 516 that is in line with rotation points 502a through 502d can be actuated by a motor, indicated by 508, in order to move the coupling piece 506 by the rotation point 517; the movement indicated by arrows 520.

Figure 6:
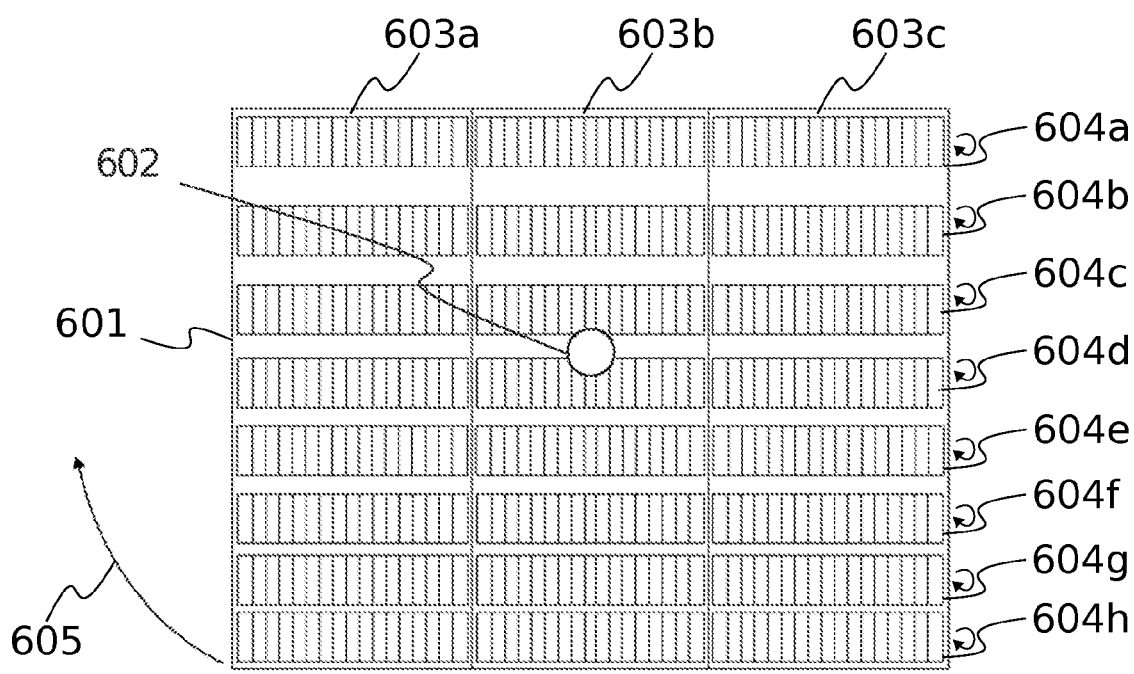
FIG. 6 illustrates a solar device of rows of reflectors separated into columns.

FIG. 6 illustrates a solar device.

The top view of an assembly of assemblies of FIG. 3 are shown, the FIG. 3 assemblies, indicated by 604a through 604h, can be arranged in columns indicated by 603a, 603b and 603c. The entire frame, indicated by 601, inclination with respect to the ground is fixed, but is free to rotate around the vertical axis as shown by movement arrow 605; an actuator can rotate the frame to face the sun. The FIG. 3 assemblies, 604a through 604h, can rotate on their respective support to reflect sunrays to converge on the absorber/target, indicated by 602. Optionally, the entire frame can then be tilted to reduce aberrations, and/or, an actuator can move the absorber to reduce aberrations and increase concentration factor.

Figure 7:
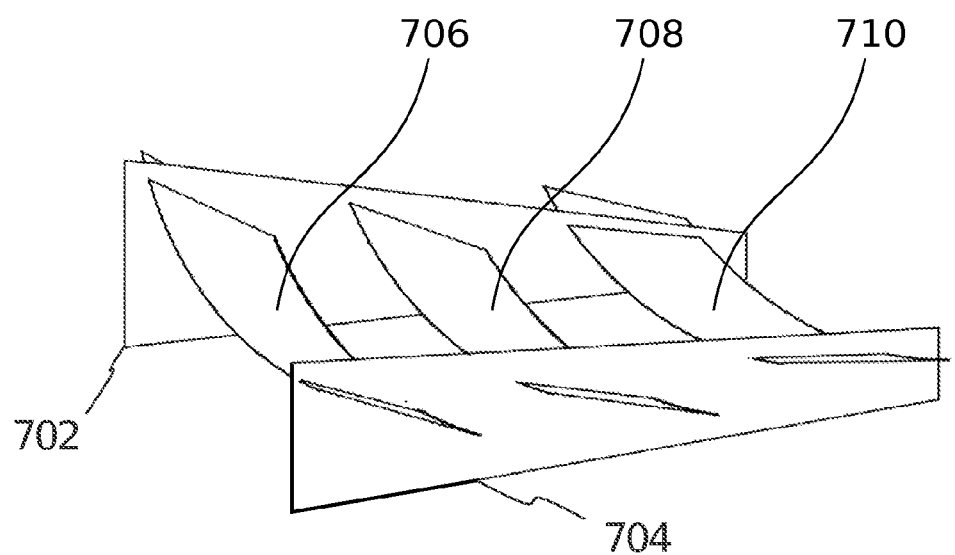
FIG. 7 illustrates a solar device, of support structure for reflectors.

FIG. 7 illustrates a solar device, of support structure for reflectors. FIG. 7 illustrates an assembly where individual reflectors, indicated by 706, 708 and 710 are supported by "slits" in sheet support structures. 2 supports plates/sheets, indicated by 704 and 702, are shown in this figure that could support flat or 2D pre-curved/molded reflectors. More support plates/sheets can be used employing slites to force-flex flat facets/reflectors as in FIGS. 2-4. The two plates/sheets, 702 and 704, must be rigidly joined as in FIGS. 2-4 to then couple to the frame.

According to an embodiment of a method for utilizing solar energy, the method comprises directing sunrays or sunbeams or other solar radiation with at least one solar concentrator towards at least one application, device or equipment utilizing solar energy.

According to an embodiment of an arrangement for utilizing solar energy, the arrangement comprises at least one solar concentrator and at least one application, device or equipment utilizing solar energy, and in which arrangement the solar concentrator is arranged to direct sunrays or sunbeams or other solar radiation towards the application, device or equipment utilizing solar energy.

According to an embodiment of a method for implementing or designing an arrangement for utilizing solar energy, which arrangement comprises at least one application, device or equipment utilizing solar energy and at least one solar concentrator arranged to direct sunrays or sunbeams or solar radiation towards the application, device or equipment utilizing solar energy, the method comprises determining at least one parameter relating to a construction or operation of the solar concentrator and/or at least one parameter relating to a construction or operation of the application, device, or equipment utilizing solar energy.

According to an embodiment of a system for implementing or designing an arrangement for utilizing solar energy, which arrangement comprises at least one application, device or equipment utilizing solar energy and at least one solar concentrator arranged to direct sunrays or sunbeams towards the application, device or equipment utilizing solar energy, the system comprises at least means for determining at least one parameter relating to a construction or operation of the solar concentrator and/or at least one parameter relating to a construction or operation of the application, device, or equipment utilizing solar energy.

According to an embodiment of a computer program product, the computer program product comprises program code means configured to execute the method when being run on an intelligent electronic device including a processor executing the computer program and a non-transitory computer readable recording medium for recording thereon the computer program.

It will be appreciated by those skilled in the art that the present disclosure can be embodied in other forms without departing from the spirit or essential characteristics thereof. The presently disclosed embodiments are therefore considered in all respects to be illustrative and not restricted. The scope of the disclosure in indicated by the appended claims rather than the foregoing description and all changes that come within the meaning and range and equivalence thereof are intended to be embraced therein.

The method for implementing or designing the arrangement for utilizing solar energy, as presented above, may be carried out by a microprocessor or signal processor in an intelligent electronic device executing one or more software or computer programs which are designed for the purpose and which are tangibly recorded on a non-transitory computer-readable recording medium such as a non-volatile memory. The intelligent electronic device executes the computer or software program tangibly recorded on the non-transitory computer-readable recording medium.

The invention claimed is:

1. An arrangement for utilizing solar energy, the arrangement comprising:
at least one solar concentrator; and at least one application, device or equipment utilizing solar energy, the at least one solar concentrator comprising:
a body frame; and
a plurality of reflectors arranged in rows supported by the body frame,
wherein each reflector in a row is at a different angle towards the application, device or equipment utilizing solar energy,
wherein the solar concentrator is arranged to direct sunrays or sunbeams towards the application, device or equipment utilizing solar energy, and
wherein the body frame and the reflectors are rotatable each on a single axis that are arranged with respect to each other perpendicularly, and the rows are respectively coupled to the body frame in such a manner that rotation points for the coupling with respect to a rotation point of each row are parallel so as to enable rotation of one row alone and rotation of the one row together with other rows of the arrangement.

2. The arrangement according to claim 1, wherein each of the rows are rotatable to direct sunrays or sunbeams towards the application, device or equipment utilizing solar energy, and wherein the application, device or equipment is fixed relative to the ground.

3. The arrangement according to claim 1, wherein each of the rows are rotatable to direct sunrays or sunbeams towards the application, device or equipment utilizing solar energy, and wherein the application, device or equipment is movable for increasing the concentration factor of the application, device or equipment utilizing solar energy.

4. The arrangement according to claim 1, wherein the reflectors are curved with two dimensional, 2D, or three dimensional, 3D, curvature for directing sunrays or sunbeams to the application, device or equipment utilizing solar energy.

5. The arrangement according to claim 1, comprising a plurality of overlapping solar devices, each solar device comprising:
a body frame; and
a plurality of reflectors arranged in rows supported by the body frame, wherein each reflector in a row is at a different angle towards the application, device or equipment utilizing solar energy.

6. The arrangement according to claim 1, wherein the arrangement comprises at least one or more absorbers for receiving the sunrays reflected from reflectors.

7. The arrangement according to claim 1, wherein the arrangement comprises an absorber for receiving the sunrays reflected from reflectors.

8. The arrangement according to claim 1, wherein the reflectors in a row are supported by a single piece of material extending through the length of the row, or reflectors in a row are supported by a plurality of sheets of material separated by a distance such that the reflectors are supported by the sheets at specific positions on the reflectors.

9. The arrangement according to claim 1, wherein the reflectors in a row are supported by a plurality of sheets of material separated by a distance, said sheets being interconnected with each other, and the rows of reflectors are interconnected by a connector part that is arranged to engage at least one sheet in each row at connection points on the sheets, wherein the connection points are arranged on the sheets such that the rows are at different angles relative to each other for directing sunrays or sunbeams towards the application, device or equipment utilizing solar energy.

10. The arrangement according to claim 1, comprising reflectors, wherein the reflectors in a row are supported by a single piece of material extending through the length of the row, or reflectors in a row are supported by a plurality of sheets of material separated by a distance such that the reflectors are supported by the sheets at specific positions on the reflectors, wherein the reflectors are fixed on top of at least two sheets.

11. The arrangement according to claim 1, comprising reflectors, wherein the reflectors in a row are supported by a single piece of material extending through the length of the row, or reflectors in a row are supported by a plurality of sheets of material separated by a distance such that the reflectors are supported by the sheets at specific positions on the reflectors, wherein the sheets have slits and the reflectors are inserted through slits of at least two parallel sheets.

12. The arrangement according to claim 9, wherein the connector part provides rotation of the row alone and rotation of the row together with other rows of the arrangement.

13. A system for implementing an arrangement for utilizing solar energy, the arrangement comprising:
at least one application, device or equipment utilizing solar energy;
at least one solar concentrator arranged to direct sunrays or sunbeams towards the application, device or equipment utilizing solar energy; and
means for determining at least one parameter relating to a construction or operation of the solar concentrator and/or at least one parameter relating to a construction or operation of the application, device, or equipment utilizing solar energy,
wherein the at least one solar concentrator comprises:
a body frame; and
a plurality of reflectors arranged in rows supported by the body frame;
wherein each reflector in a row is at a different angle towards the application, device or equipment utilizing solar energy, and
wherein the body frame and the reflectors are rotatable each on a single axis that are arranged with respect to each other perpendicularly, and the rows are respectively coupled to the body frame in such a manner that rotation points for the coupling with respect to a rotation point of each row are parallel so as to enable rotation of one row alone and rotation of the one row together with other rows of the arrangement.

14. The system according to claim 13, wherein the system comprises an intelligent electronic device including a processor and a memory, said electronic device and the memory being operatively coupled to execute a method, comprising at least one of: tracking a solar device, minimizing geometric aberration, reducing obstruction or shadowing for adjacent reflectors on a row, increasing concentration factor by curving individual reflectors on solar device, simulating power output, removing inefficient reflectors, optimizing simple absorber surface area, minimizing geometric aberration by linear variation of absorber position, increasing land-use by overlapping devices, increasing land-use efficiency by placing multiple concentrator systems on single base frame, optimizing a secondary optic, optimizing row positioning, dynamically covering net-loss absorber surfaces, reducing aberration by dynamic frame rotation.

* * * * *